US010676800B2

(12) United States Patent
Meyer et al.

(10) Patent No.: US 10,676,800 B2
(45) Date of Patent: Jun. 9, 2020

(54) METHOD OF ADDITIVE MANUFACTURING AND HEAT TREATMENT

(71) Applicant: AIRBUS OPERATIONS LIMITED, Bristol (GB)

(72) Inventors: Jonathan Meyer, London (GB); Andrew Henstridge, London (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 738 days.

(21) Appl. No.: 14/885,177

(22) Filed: Oct. 16, 2015

(65) Prior Publication Data

US 2016/0108483 A1   Apr. 21, 2016

(30) Foreign Application Priority Data

Oct. 17, 2014   (GB) .................................. 1418467.5

(51) Int. Cl.
*B22F 3/105* (2006.01)
*B29C 64/245* (2017.01)
(Continued)

(52) U.S. Cl.
CPC .............. *C21D 1/00* (2013.01); *B22F 3/1055* (2013.01); *B23K 26/082* (2015.10);
(Continued)

(58) Field of Classification Search
CPC ............ B22F 3/1055; B22F 2003/1056; B22F 2003/1057; B22F 2003/1058;
(Continued)

(56) References Cited

U.S. PATENT DOCUMENTS 6,925,346 B1    8/2005  Mazumder et al.
7,344,608 B2 *  3/2008  Clark ..................... B23K 9/044
                                                    148/522
(Continued)

FOREIGN PATENT DOCUMENTS

EP    1543908 A2      6/2005
GB    2500412 A  *   9/2013  ......... B29C 67/0092
(Continued)

OTHER PUBLICATIONS

Colegrove, P.A. et al. "Microstructure and residual stress improvement in wire and arc additively manufactured parts through high-pressure rolling" Journal of Materials Processing Technology 213 (2013) 1782-1791.

(Continued)

*Primary Examiner* — Vanessa T. Luk
(74) *Attorney, Agent, or Firm* — Nixon & Vanderhye P.C.

(57) ABSTRACT

A method of additive manufacturing and heat treatment. A substrate is secured to a fixture and an additive manufacturing system is operated to perform a build process by building a part on the substrate secured to the fixture, the part being built by forming a series of layers of metallic material on the substrate, the metallic material melting and solidifying during the build process thereby bonding the part to the substrate and creating thermally induced stress in the part. The part, the substrate and the fixture are moved together from the additive manufacturing system to a heat treatment system, wherein the substrate remains secured to the fixture and the part remains bonded to the substrate as they are moved. The heat treatment system is operated to perform a heat treatment process by heating the part, the substrate and the fixture together thereby relieving the thermally induced stress in the part, the substrate remaining secured to the fixture during the heat treatment process. Finally the substrate is released from the fixture and the part and the (Continued)

substrate are removed from the fixture. The part remains bonded to the support as they are removed from the fixture.

19 Claims, 5 Drawing Sheets

(51) Int. Cl.
| | |
|---|---|
| *B29C 64/188* | (2017.01) |
| *B29C 64/153* | (2017.01) |
| *B33Y 10/00* | (2015.01) |
| *B33Y 40/20* | (2020.01) |
| *C21D 1/00* | (2006.01) |
| *B23K 26/342* | (2014.01) |
| *B23K 37/04* | (2006.01) |
| *B23K 26/082* | (2014.01) |
| *C21D 9/50* | (2006.01) |
| *B23K 26/70* | (2014.01) |
| *B23K 26/14* | (2014.01) |
| *B23K 103/14* | (2006.01) |
| *B23K 103/10* | (2006.01) |

(52) U.S. Cl.
CPC ........ *B23K 26/1476* (2013.01); *B23K 26/342* (2015.10); *B23K 26/702* (2015.10); *B23K 37/0408* (2013.01); *B29C 64/188* (2017.08); *B29C 64/245* (2017.08); *C21D 9/50* (2013.01); *B23K 2103/10* (2018.08); *B23K 2103/14* (2018.08); *B29C 64/153* (2017.08); *B33Y 10/00* (2014.12); *B33Y 40/20* (2020.01); *C21D 2251/00* (2013.01)

(58) Field of Classification Search
CPC . B22F 2003/1059; B29C 64/00; B29C 64/10; B29C 64/141; B29C 64/147; B29C 64/153; B29C 64/188; B29C 64/194; B29C 64/245; B29C 64/40
See application file for complete search history.

(56) References Cited

U.S. PATENT DOCUMENTS

| | | | |
|---|---|---|---|
| 8,486,490 B2 * | 7/2013 | Fuwa | .................... B22F 3/1055 |
| | | | 427/299 |
| 2012/0100030 A1 | 4/2012 | Green | |
| 2013/0101728 A1 | 4/2013 | Keremes et al. | |
| 2014/0302188 A1 * | 10/2014 | Rix | .................... B29C 67/0085 |
| | | | 425/174.4 |

FOREIGN PATENT DOCUMENTS

| | | | | |
|---|---|---|---|---|
| WO | WO 2013064767 A1 * | 5/2013 | ......... | B29C 67/0085 |
| WO | 2013140146 A1 | 9/2013 | | |
| WO | 2013160188 A1 | 10/2013 | | |
| WO | 2014072699 A1 | 5/2014 | | |

OTHER PUBLICATIONS

ASTM International—Standard Terminology for Additive Manufacturing Technologies. (Sep. 2013).

* cited by examiner

METHOD OF ADDITIVE MANUFACTURING AND HEAT TREATMENT

RELATED APPLICATIONS

The present application claims priority form Great Britain Application Number 1418467.5, filed Oct. 17, 2014, the disclosure of which is hereby incorporated by reference herein in its entirety.

FIELD OF THE INVENTION

The present invention relates to a method and associated apparatus for additive manufacturing and heat treatment.

BACKGROUND OF THE INVENTION

Additive manufacturing typically involves the production of three-dimensional parts by depositing material layer by layer to build either complete components or add features to a pre-formed substrate. It contrasts with conventional subtractive machining processes, in that a component produced by an additive manufacturing process is near net shape, i.e. it is close to its final (net) shape thereby reducing the need for additional finishing and wasted excess material.

A key challenge with additive manufacturing processes, particularly for the production of larger components, is the distortion of the manufactured part during the deposition process due to the high internal stresses generated as the deposited material solidifies.

A solution to this problem is presented in WO2014/072699. A bed supports a parent plate of a work piece which is held in position by clamps. A stack of layers is built on the parent plate by a process of additive manufacturing, and stresses in the work piece are measured by load cells while progressively forming the stack. If such stresses are above a predetermined threshold, the work piece is stress relieved by a cold working process such as cold rolling or peening while mounted to the additive manufacturing apparatus.

SUMMARY OF THE INVENTION

A first aspect of the invention provides a method of additive manufacturing and heat treatment, the method comprising: a. securing a substrate to a fixture; b. operating an additive manufacturing system to perform a build process by building a part on the substrate secured to the fixture, the part being built by forming a series of layers of metallic material on the substrate, the metallic material melting and solidifying during the build process thereby bonding the part to the substrate and creating thermally induced stress in the part; c. moving the part, the substrate and the fixture from the additive manufacturing system to a heat treatment system, wherein the substrate remains secured to the fixture and the part remains bonded to the substrate as they are moved; d. operating the heat treatment system to perform a heat treatment process by heating the part, the substrate and the fixture together thereby relieving the thermally induced stress in the part, the substrate remaining secured to the fixture during the heat treatment process; and e. releasing the substrate from the fixture and separating the part and the substrate from the fixture, wherein the part remains bonded to the substrate as they are separated from the fixture. A bending stiffness of the fixture is greater than a bending stiffness of the part. This ensures that the part is held approximately flat during both the build process and the heat treatment process.

The bending stiffness of the fixture and the part are typically measured perpendicular to an axis along which deposition of the material takes place. That is, the build process typically defines an axis along which deposition of the metallic material takes place, and a bending stiffness of the fixture is greater than a bending stiffness of the part measured perpendicular to the axis along which deposition of the metallic material takes place.

The invention provides an alternative to the stress relief method presented in WO2014/072699, and is believed to provide improved stress relief performance. The bed in WO2014/072699 is not suited for heat treatment because: it is a heavy structure which is not suited to being moved easily from the additive manufacturing system; it may be too large to fit into a conventional heat treatment furnace; it may not be able to withstand the temperatures in a heat treatment furnace; and it is likely to have a very high thermal mass.

A wide variety of additive manufacturing process may be employed, including (but not limited to) directed energy deposition (in which thermal energy is used to fuse the metallic material as it is deposited); powder bed fusion (in which thermal energy selectively fuses regions of a powder bed); or any other additive manufacturing process which creates thermally induced stress in the built part. In one embodiment of the invention the additive manufacturing process forms the series of layers of metallic material on the substrate by feeding metallic feedstock material and melting the metallic feedstock material with a laser beam, electric current or other thermal energy source as it is deposited.

The substrate may be secured to the fixture by bonding but more preferably the substrate is secured to the fixture by an attachment system in step a.; and the attachment system is released in step e. so that the substrate is no longer secured to the fixture by the attachment system. For instance the attachment system may comprises one or more attachment members (such as clamps or fasteners) which are engaged with the substrate in step a. and disengaged from the substrate in step e.

Preferably the substrate is secured to the fixture by one or more clamps or fasteners in step a.; and the (or each) clamp or fastener is released in step e. so that the substrate is no longer secured to the fixture. Where fasteners are used, then the substrate may be secured to the fixture by one or more fasteners in step a. by passing the (or each) fastener through a respective pre-formed hole in the substrate; and the (or each) fastener is released in step e. by removing it from its respective pre-formed hole in the substrate.

Typically the substrate contacts the fixture at a substrate/fixture interface during the heat treatment process. Preferably the substrate and fixture are formed from dissimilar materials at the substrate/fixture interface, thereby inhibiting bonding between them at the substrate/fixture interface during the heat treatment process.

Optionally the fixture comprises an interface layer which contacts the substrate and is formed from a different material to the substrate.

Optionally the part, the substrate and the fixture are allowed to distort during the build process; and the part and the fixture are formed from materials which are selected such that the part and the fixture have a difference in bending stiffness which increases as they are heated during the heat treatment process; the increased difference in bending stiffness causing at least some of the distortion which occurred during the build process to be removed during the heat treatment process.

During the heat treatment process the temperatures of the part, the substrate and the fixture are typically increased to above 150° C. and maintained above 150° C. for more than 30 minutes.

During the heat treatment process the temperatures of the part, the substrate and the fixture are optionally increased to above 500° C. and maintained above 500° C. for more than 30 minutes.

A temperature sensor may be integrated into the fixture or the attachment system and arranged to measure temperature during the heat treatment process.

Preferably the fixture has a mass which is less than ten times, preferably less than five times, and most preferably less than two times a collective mass of the substrate and the part. This makes it easy to transfer them between the additive manufacturing system and the heat treatment system. Where an attachment system is provided, then typically the fixture and attachment system have a collective mass which is less than ten times, preferably less than five times, and most preferably less than two times a collective mass of the substrate and the part.

Preferably the fixture has a thermal mass which is less than ten times, preferably less than five times, and most preferably less than two times a collective thermal mass of the substrate and the part. This ensures that the various parts heat and cool at a similar rate during the heat treatment process. Where an attachment system is provided, then typically the fixture and attachment system have a collective thermal mass which is less than ten times, preferably less than five times, and most preferably less than two times a collective thermal mass of the substrate and the part.

The part and the substrate are typically separated from the fixture by removing them from the fixture, although conceivably they could be separated from the fixture by moving the fixture rather than by moving the part and the substrate.

Typically step b. of the method is performed after step a.

Typically all steps of the method are performed in order a. to e.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
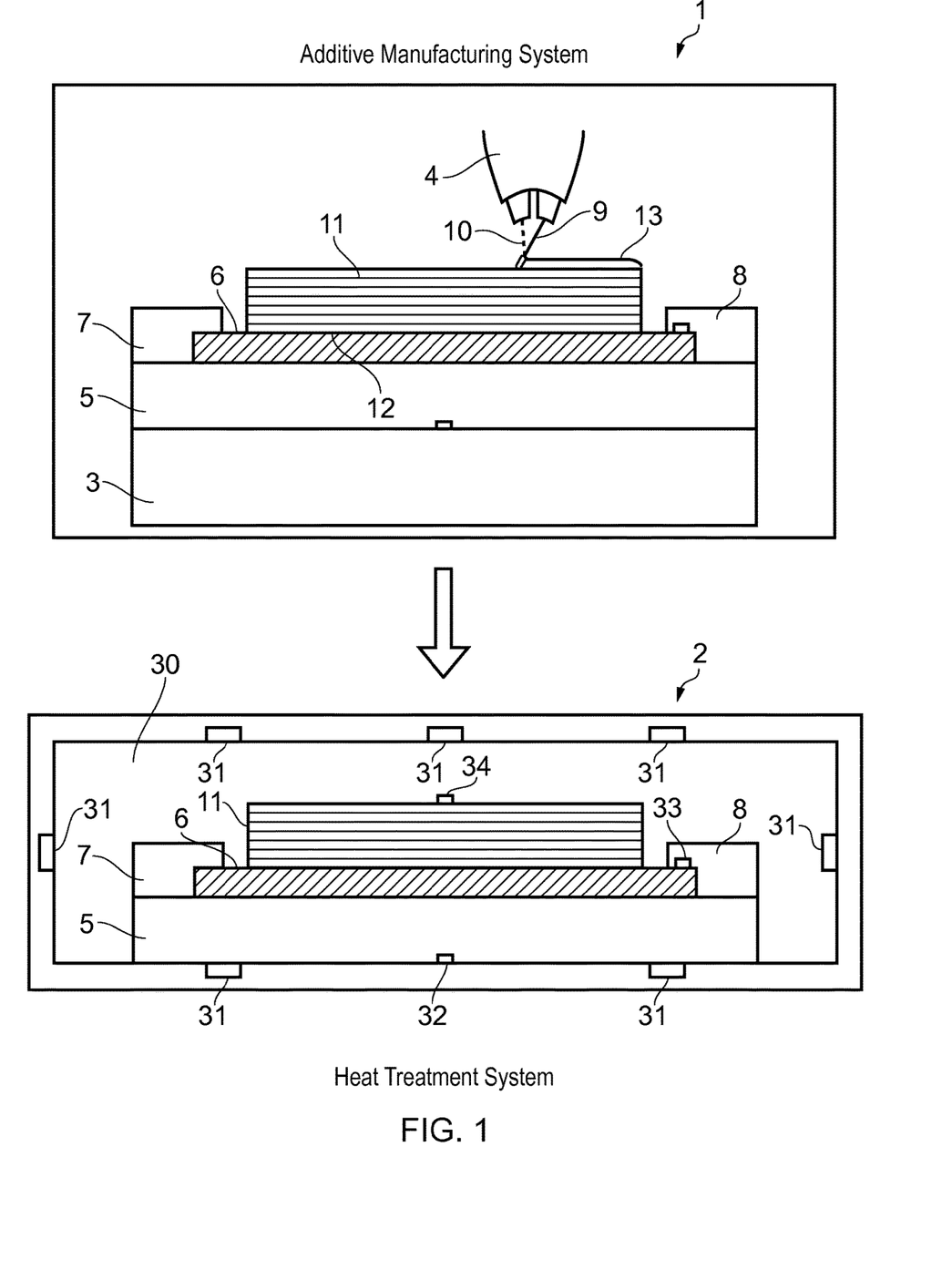
FIG. 1 illustrates an additive manufacturing system and heat treatment system.

FIG. 1 shows an additive manufacturing system 1 and a heat treatment system 2. The additive manufacturing system 1 comprises a chamber containing a table 3 and a build head 4. A fixture 5 is shown in FIG. 1 on the table 3.

In a first step, a substrate 6 is placed on the fixture 5 and secured by clamps 7, 8. The substrate is pre-formed, in other words it is not formed by additive manufacturing on the fixture 5. Typically the substrate 6 is secured to the fixture 5 outside the chamber of the additive manufacturing system 1, and then the fixture 5 carrying the substrate 6 is introduced into the chamber and placed on the table 3.

In a second step, the build head 4 is operated to perform a build process by building a near net shape part 11 on the substrate 6 secured to the fixture 5. The build head 4 feeds metallic feedstock material 9 (such as titanium alloy or aluminium alloy) towards the substrate, and the material 9 is melted by a laser beam 10 as it is fed onto the substrate. The feedstock material 9 may be fed in the form of a wire or a blown powder, for example. The build head 4 is scanned across the substrate 6 to build a part by forming a series of layers of metallic material on the substrate. These layers include a first layer which fuses to the substrate at a part/substrate interface 12, and a series of additional layers each of which fuses with a previously deposited layer. One of these additional layers 13 is shown in the process of being laid down by the build head 4. The shape and size of each layer is determined in accordance with a computer aided design (CAD) model of the part 11 stored in a memory. Although the layers are all identical in FIG. 1 for ease of illustration, they may in general have different shapes and/or sizes.

Figure 2:
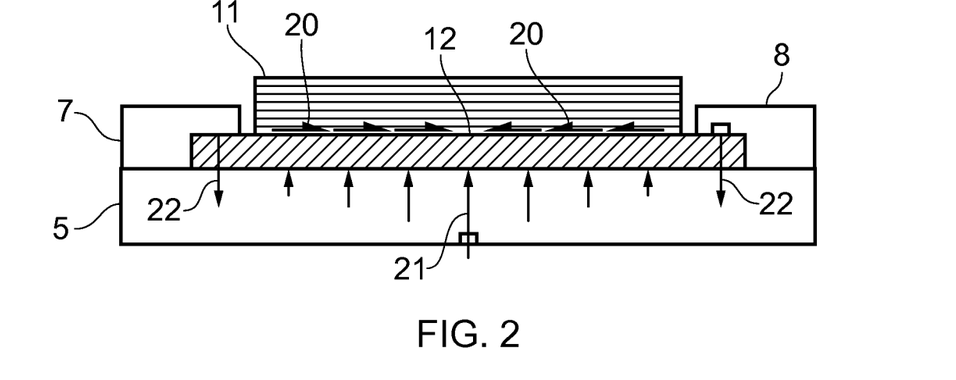
FIG. 2 illustrates the forces acting on the substrate in the clamped condition during deposition.
Figure 3:
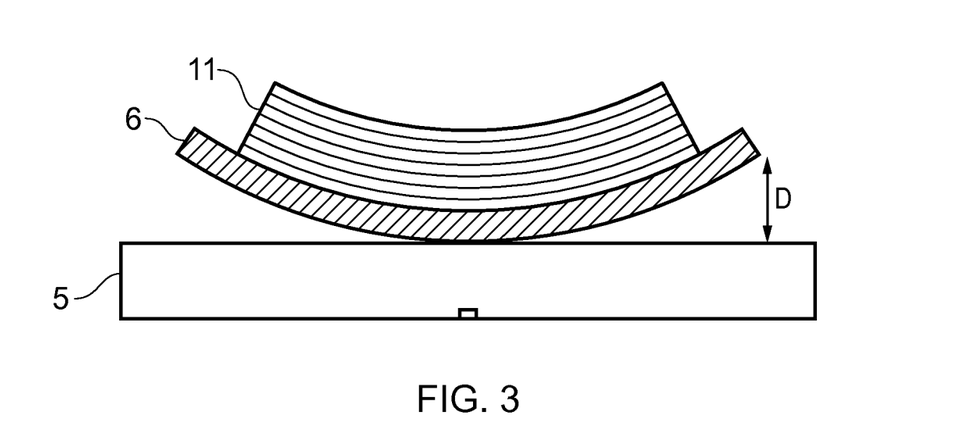
FIG. 3 illustrates the distortion which would result if the clamps were released before heat treatment.

The metallic material melts and solidifies during the build process, thereby fusing the part 11 to the substrate 6 and creating thermally induced stress in the part 11. The forces acting on the substrate 6 in the clamped condition during the build process are shown in FIG. 2. These include shear forces 20 at the interface 12 generated by the shrinkage of the metal as it solidifies and fuses to the substrate 6. These shear forces 20 are reacted by upward reaction forces 21 from the fixture and downward reaction forces 22 from the clamps. If the clamps 7, 8 were released then the bending moment generated by the shear forces 20 would cause the part 11 and substrate 6 to become distorted as shown in FIG. 3.

Returning to FIG. 1, after the part 11 has been fully built, the part 11, the substrate 6 and the fixture 5 are lifted off the table 3, removed from the chamber, and moved together to the heat treatment system 2. The substrate 6 remains clamped to the fixture 5 and the part 11 remains bonded to the substrate 6 as they are moved.

The fixture 5 and clamps 7, 8 are as light as possible so they can be manually moved relatively easily between the additive manufacturing system 1 and the heat treatment system 2. Typically a collective weight of the fixture 5 and the clamps 7, 8 is less than ten times the collective weight of the substrate 6 and the part 11. More preferably a collective weight of the fixture 5 and the clamps 7, 8 is less than five times the collective weight of the substrate 6 and the part 11. Most preferably a collective weight of the fixture 5 and the clamps 7, 8 is less than twice the collective weight of the substrate 6 and the part 11.

Next the heat treatment system 2 is operated to perform a heat treatment process by heating the part 11, the substrate 6 and the fixture 5 together thereby relieving the thermally induced stress in the part, the substrate remaining clamped to the fixture during the heat treatment process. The heat treatment system 2 comprises a chamber 30 and heating elements 31 such as electric resistive heaters (or any other kind of heating element). The nature of the heat treatment process depends on a number of factors, principally the material of the part 11—specifically the chemical composition of the feedstock material and the desired microstructure and properties of the part. Generally speaking, the heat treatment process involves increasing the temperature to an elevated stress relieving temperature at which at least some of the thermally induced stress in the part 11 is relieved by a process of creep relaxation.

In one example, in the case where the part 11 is formed from a titanium alloy such as Ti6Al4V, the heating elements 31 are operated to increase the temperature in the chamber from room temperature up to an elevated stress relieving temperature of about 680° C. over a period of about 90 minutes, the temperature is held at this elevated temperature for about 180 minutes, and then the heating elements 31 are turned off and the temperature returns to room temperature over a period of the order of 90 minutes. In another example, in which the part 11 is formed from an aluminium alloy, then a lower stress relieving temperature of the order of 180° C. can be used.

The maximum bending stress generated in the fixture 5 by the internal stresses in the part 11 is much less than the stress at which the fixture 5 will experience plastic deformation at the heat treatment temperature, so the fixture 5 remains in the linear elastic regime during the heat treatment process.

The fixture 5 is designed with sectional and material properties such that at the elevated stress relieving temperature the bending stiffness of the fixture 5 is much greater than the bending stiffness of the part 11 (typically at least ten times greater) measured perpendicular to the axis along which deposition takes place—in this case the vertical (Z) axis. That is, for each horizontal axis (X,Y): $E_f*I_f \gg E_p*I_p$ where $E_f$ is the elastic modulus of the material forming the fixture 5, $I_1$ is the areal moment of inertia of the fixture 5, $E_p$ is the elastic modulus of the material forming the part 11 and $I_p$ is the areal moment of inertia of the part 11. This ensures that the part 11 is held approximately flat during both the build process and the heat treatment process.

Note that the fixture 5, the clamps 7, 8, the substrate 6 and the part 11 are all heated during the heat treatment process. The fixture 5 and clamps 7, 8 are both formed from a material, for instance steel, which is be able to withstand the high temperature of the heat treatment process. Also the thermal mass of the fixture 5 and clamps 7, 8 are designed to be relatively low so that the time (and energy) required to heat them up is not too great.

Typically a collective thermal mass of the fixture 5 and the clamps 7, 8 is less than ten times the collective thermal mass of the substrate 6 and the part 11. Preferably a collective thermal mass of the fixture 5 and the clamps 7, 8 is less than five times the collective thermal mass of the substrate 6 and the part 11. More preferably a collective thermal mass of the fixture 5 and the clamps 7, 8 is less than twice the collective weight of the substrate 6 and the part 11.

Most preferably a collective thermal mass of the fixture 5 and the clamps 7, 8 is approximately equal to the collective weight of the substrate 6 and the part 11, in other words: Cp(fix)*m(fix)+Cp(cl)*m(cl)≈Cp(sub)*m(sub)+Cp(part)*m(part), where Cp(fix) is the specific heat capacity of the fixture 5; m(fix) is the mass of the fixture 5; Cp(cl) is the specific heat capacity of the clamps 7, 8; m(cl) is the mass of the clamps 7, 8; Cp(sub) is the specific heat capacity of the substrate 6; m(sub) is the mass of the substrate 6; Cp(part) is the specific heat capacity of the part 11; and m(part) is the mass of the part 11.

Making the collective thermal masses approximately equal is preferred because it means that the various elements will tend to heat and cool at a similar rate during and immediately after the heat treatment process.

The substrate 6 is preferably formed from a material which is dissimilar to the material forming the fixture 5 at the substrate/fixture interface where they engage each other thereby inhibiting diffusion bonding between them during the heat treatment process. Similarly the substrate 6 is preferably formed from a material which is dissimilar to the material forming the clamps 7, 8 at the interface where they engage each other thereby inhibiting diffusion bonding between them during the heat treatment process. By way of example the fixture and clamps may be made of steel, and the substrate may be made of Titanium Alloy. Optionally, the upper surface of the fixture 5 has a heat resistant interface layer (such as graphite) which contacts the substrate 6 in order to inhibit diffusion. The interface layer may be a separate layer, or a coating on the fixture 5.

Thermocouple temperature sensors 32, 33, 34 are used to measure the temperature of the fixture, 5, substrate 6 and part 11 respectively during the heat treatment process, and the measured temperatures are used to control the heating elements 31. The sensors 32 and 33 are integrated into the fixture 5 and clamp 8 respectively. The sensor 33 is thermally insulated from the clamp 8 but pressed into intimate engagement with the substrate 6 by the clamp.

When the heat treatment process is complete, the fixture, substrate and part are removed together from the heat treatment chamber 30. Then the substrate is released from the fixture by removing the clamps 7, 8. The heat treatment process reduces the degree of distortion when the clamps are released. An experimental part was produced by following the process described above, and the distortion (indicated by distance D in FIG. 3) after the clamps were released following heat treatment was measured to be about 0.2 mm, compared with a distortion of about 3 mm for a reference part which was clamped during deposition but the clamps were released prior to heat treatment (the heat treatment on the unclamped reference part having little or no effect on reducing the distortion). Finally the part 11 and the substrate 6 are removed together from the fixture, the part remaining bonded to the substrate as they are removed.

Figure 4:
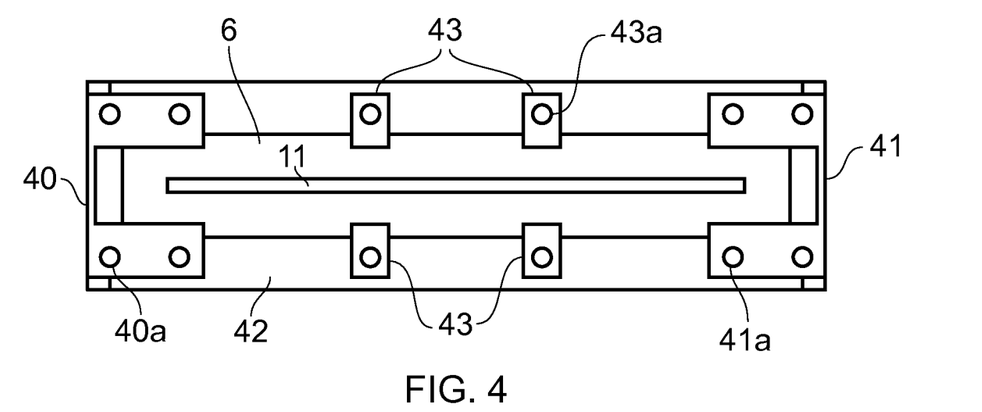
FIG. 4 is a plan view of an alternative tooling arrangement.
Figure 5:
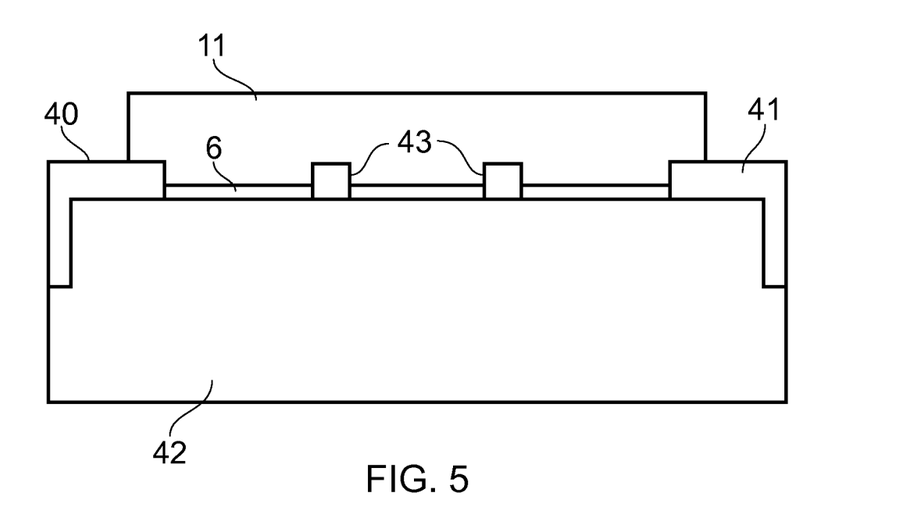
FIG. 5 is a side view of the tooling arrangement of FIG. 4.
Figure 6:
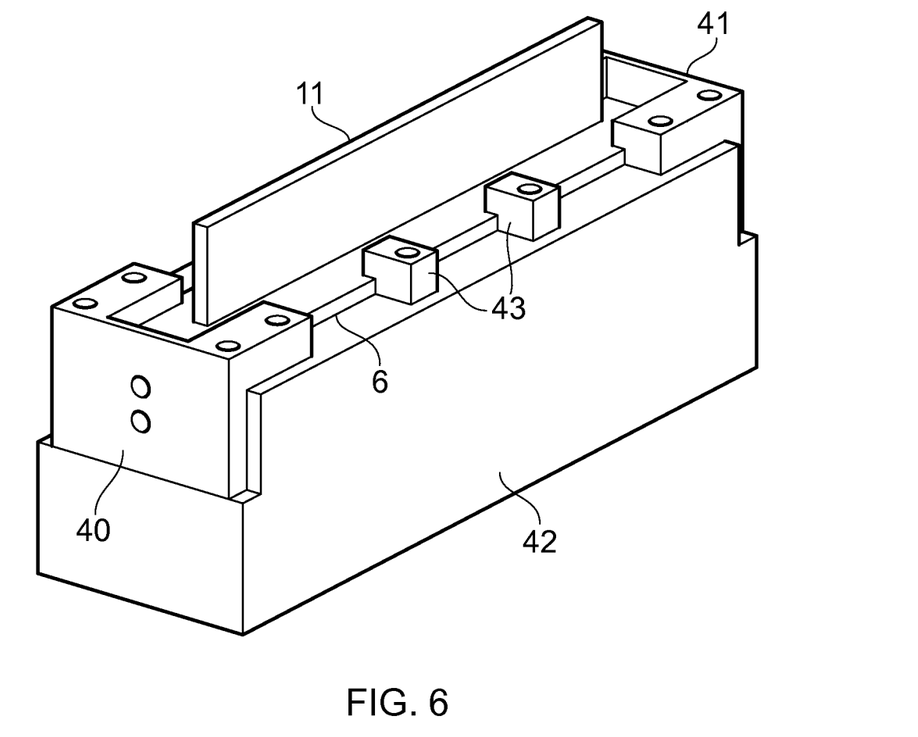
FIG. 6 is an isometric view of the tooling arrangement of FIG. 4.

FIGS. 4-6 show an alternative fixture and clamping arrangement suitable for use in the process of FIG. 1. In this case the tooling has two end clamps 40, 41 each of which is secured to the fixture 42 by four fasteners 40a, 41a; and four central clamps 43 each of which is secured to the fixture 42 by a respective fastener 43a. The clamps 40, 41, 43 are tightened by screwing the fasteners 41a, 43a into the fixture, and released by removing the fasteners then lifting off the clamps.

In the example of FIGS. 4-6 there are a number of clamps distributed around the periphery of the substrate 6, but in a further embodiment (not shown) a single "picture frame" clamp may be used to clamp the substrate to the fixture around its full periphery.

Figure 7:
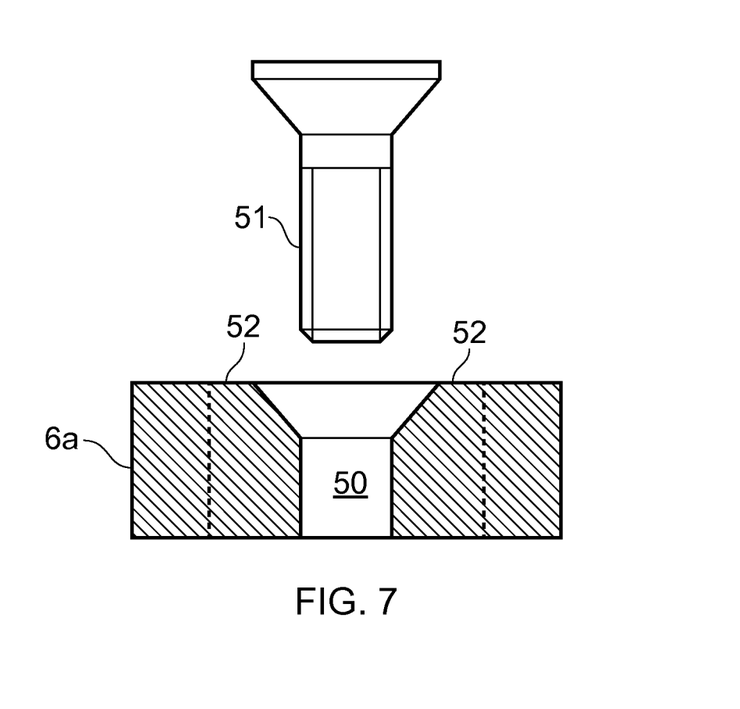
FIG. 7 shows an alternative method of securing the substrate to the fixture.

In a further embodiment shown in FIG. 7, the substrate 6 is replaced by a substrate 6a with pre-formed undersized countersunk holes 50, only one of which is shown in FIG. 7. Rather than being secured to the fixture by clamps, the substrate 6a is secured to the fixture by a number of screws 51 or other fasteners, each of which passes through a respective hole 50 and is screwed into the fixture below it. After the part 11 has been built on the substrate 6a, the screws 50 are released by removing them from their holes 50, and the substrate 6a is removed from the fixture. Then the holes 50 are enlarged by drilling out material 52 to form cylindrical holes with parallel sides indicated by dotted lines in FIG. 7.

A further problem associated with the shear forces 20 shown in FIG. 2 is that they may become sufficiently large to initiate and grow cracks at the interface 12. Optionally two methods of reducing this problem may be employed.

One method is to perform in-situ interpass rolling of the deposited material in order to introduce compressive stress and minimise the build-up of shear stress at the interface 12. This process is performed during the build process and before the part 11 is complete, so for example the layer 13 may be compressed during the build process after it has been formed but before the next layer is formed on top of it. This in-situ stress relieving process may be performed for each layer, or for selected layers only. The rolling process is performed "cold"—i.e. at a temperature which is much less than the elevated stress relieving temperature. Other cold working methods could be used such as laser shock peening, shot peening or ultrasonic peening.

Figure 8:
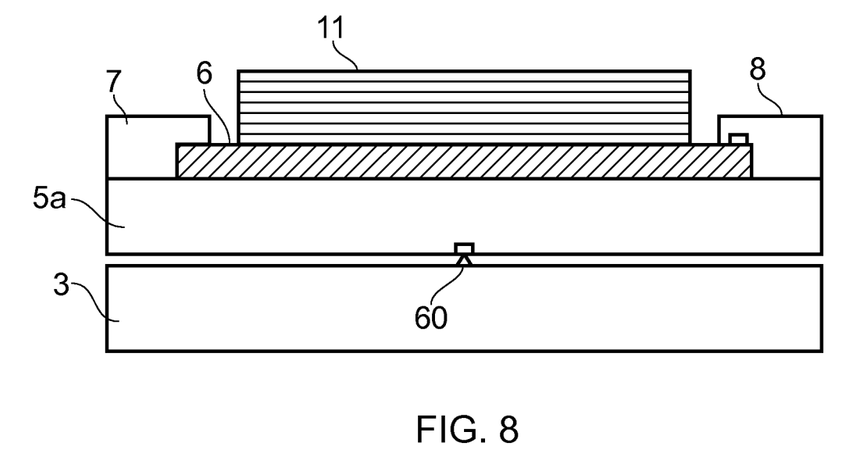
FIG. 8 shows a further alternative tooling arrangement.
Figure 9:
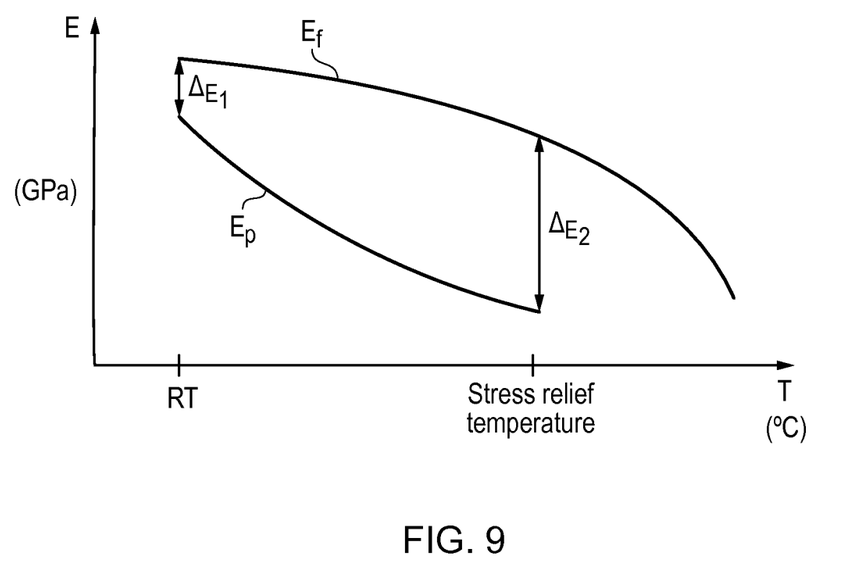
FIG. 9 is a graph showing variation of elastic modulus with temperature for the part and the fixture.

Another method is to reduce the bending stiffness of the fixture to allow the part 11, the substrate 6 and the fixture to distort slightly during the build process in order to prevent the shear stress exceeding a critical level at which cracks might form. The part 11 and the fixture are formed from materials which are selected such that they have a difference in bending stiffness which increases as they are heated during the heat treatment process. This method is illustrated in FIGS. 8 and 9. FIG. 8 shows a modified tooling arrangement in which the fixture 5a has a reduced bending stiffness compared with the fixture 5, and is mounted to the table 3 at a central mounting point 60. This central mounting point enables the fixture 5a to lift away from the table 3 more easily at its edges as it distorts. FIG. 9 is a graph showing how the elastic moduli vary with temperature, where $E_f$ is the elastic modulus of the fixture and $E_p$ is the elastic modulus of the part. At room temperature there is a differential $\Delta E_1$ at room temperature (RT) but at the elevated heat treatment temperature the differential has increased to $\Delta E_2$.

As noted above, the fixture 5a is relatively compliant during the build process so that the part 11, substrate 6 and fixture 5a distort slightly in the manner shown in FIG. 2. The increased difference in bending stiffness during heat treatment causes the fixture 5a to pull the substrate 6 and part 11 back into a flatter shape, so that at least some of the distortion which occurred during the build process is removed.

Although the invention has been described above with reference to one or more preferred embodiments, it will be appreciated that various changes or modifications may be made without departing from the scope of the invention as defined in the appended claims.

The invention claimed is:

1. A method of additive manufacturing and heat treatment, the method comprising:
   a. securing a substrate to a fixture;
   b. operating an additive manufacturing system to perform a build process by building a part on the substrate secured to the fixture, the part being built by forming a series of layers of metallic material on the substrate, the metallic material melting and solidifying during the build process thereby bonding the part to the substrate and creating thermally induced stress in the part;
   c. moving the part, the substrate and the fixture from the additive manufacturing system to a heat treatment system, wherein the substrate remains secured to the fixture and the part remains bonded to the substrate as they are moved;
   d. operating the heat treatment system to perform a heat treatment process by heating the part, the substrate and the fixture together thereby relieving the thermally induced stress in the part, the substrate remaining secured to the fixture during the heat treatment process;
   e. releasing the substrate from the fixture and separating the part and the substrate from the fixture, wherein the part remains bonded to the substrate as they are separated from the fixture; and,
   wherein a bending stiffness of the fixture is greater than a bending stiffness of the part, wherein the fixture comprises a layer which contacts the substrate and is formed from a different material to the substrate, and wherein the layer is a separate layer or a coating on the fixture.

2. The method of claim 1 wherein the substrate is secured to the fixture by an attachment system in step a.; and the attachment system is released in step e. so that the substrate is no longer secured to the fixture by the attachment system.

3. The method of claim 2 wherein the attachment system comprises one or more attachment members which are engaged with the substrate in step a. and disengaged from the substrate in step e.

4. The method of claim 2 wherein the fixture and attachment system have a collective mass or thermal mass which is less than ten times a collective mass or thermal mass of the substrate and the part.

5. The method of claim 4 wherein the fixture and attachment system have a mass or thermal mass which is less than two times a collective mass or thermal mass of the substrate and the part.

6. The method of claim 2, wherein the fixture and attachment system have a collective mass or thermal mass which is less than five times a collective mass or thermal mass of the substrate and the part.

7. The method of claim 1 wherein the substrate is secured to the fixture by one or more clamps or fasteners in step a.; and the (or each) clamp or fastener is released in step e. so that the substrate is no longer secured to the fixture.

8. The method of claim 7 wherein the substrate is secured to the fixture by one or more fasteners in step a. by passing the (or each) fastener through a respective pre-formed hole in the substrate; and the (or each) fastener is released in step e. by removing it from its respective pre-formed hole in the substrate.

9. The method of claim 1 wherein during the heat treatment process the temperatures of the part, the substrate and the fixture are increased to above 150° C. and maintained above 150° C. for more than 30 minutes.

10. The method of claim 1 wherein during the heat treatment process the temperatures of the part, the substrate and the fixture are increased to above 500° C. and maintained above 500° C. for more than 30 minutes.

11. The method of claim 1, wherein the build process defines an axis along which deposition of the metallic material takes place, and a bending stiffness of the fixture is greater than a bending stiffness of the part measured perpendicular to the axis along which deposition of the metallic material takes place.

12. The method of claim 1, wherein the layer comprises an interface layer.

13. The method of claim 12 wherein the substrate contacts the interface layer at a substrate/fixture interface during the heat treatment process, and the substrate and interface layer are formed from dissimilar materials at the substrate/fixture interface, thereby inhibiting bonding between them at the substrate/fixture interface during the heat treatment process.

14. The method of claim 12, wherein the interface layer comprises a heat resistant interface layer.

15. A method of additive manufacturing and heat treatment, the method comprising:
   a. securing a substrate to a fixture;
   b. operating an additive manufacturing system to perform a build process by building a part on the substrate secured to the fixture, the part being built by forming a series of layers of metallic material on the substrate, the metallic material melting and solidifying during the build process thereby bonding the part to the substrate and creating thermally induced stress in the part;
   c. moving the part, the substrate and the fixture from the additive manufacturing system to a heat treatment system, wherein the substrate remains secured to the fixture and the part remains bonded to the substrate as they are moved;
   d. operating the heat treatment system to perform a heat treatment process by heating the part, the substrate and the fixture together thereby relieving the thermally induced stress in the part, the substrate remaining secured to the fixture during the heat treatment process;
   e. releasing the substrate from the fixture and separating the part and the substrate from the fixture, wherein the part remains bonded to the substrate as they are separated from the fixture; and, wherein a bending stiffness of the fixture is greater than a bending stiffness of the part, wherein the fixture comprises a layer which contacts the substrate and is formed from a different material to the substrate, wherein the layer comprises a coating on the fixture.

16. A method of additive manufacturing and heat treatment, the method comprising:
   a. securing a substrate to a fixture;
   b. operating an additive manufacturing system to perform a build process by building a part on the substrate secured to the fixture, the part being built by forming a series of layers of metallic material on the substrate, the metallic material melting and solidifying during the build process thereby bonding the part to the substrate and creating thermally induced stress in the part;
   c. moving the part, the substrate and the fixture from the additive manufacturing system to a heat treatment system, wherein the substrate remains secured to the fixture and the part remains bonded to the substrate as they are moved;
   d. operating the heat treatment system to perform a heat treatment process by heating the part, the substrate and the fixture together thereby relieving the thermally induced stress in the part, the substrate remaining secured to the fixture during the heat treatment process; and
   e. releasing the substrate from the fixture and separating the part and the substrate from the fixture, wherein the part remains bonded to the substrate as they are separated from the fixture, wherein a bending stiffness of the fixture is greater than a bending stiffness of the part, wherein the fixture comprises a layer which contacts the substrate and is formed from a different material to the substrate, and wherein the part, the substrate and the fixture are allowed to distort during the build process; and the part and the fixture are formed from materials which are selected such that the part and the fixture have a difference in bending stiffness which increases as they are heated during the heat treatment process; the increased difference in bending stiffness causing at least some of the distortion which occurred during the build process to be removed during the heat treatment process.

17. A method of additive manufacturing and heat treatment, the method comprising:
   a. securing a substrate to a fixture;
   b. operating an additive manufacturing system to perform a build process by building a part on the substrate secured to the fixture, the part being built by forming a series of layers of metallic material on the substrate, the metallic material melting and solidifying during the build process thereby bonding the part to the substrate and creating thermally induced stress in the part;
   c. moving the part, the substrate and the fixture from the additive manufacturing system to a heat treatment system, wherein the substrate remains secured to the fixture and the part remains bonded to the substrate as they are moved;
   d. operating the heat treatment system to perform a heat treatment process by heating the part, the substrate and the fixture together thereby relieving the thermally induced stress in the part, the substrate remaining secured to the fixture during the heat treatment process; and
   e. releasing the substrate from the fixture and separating the part and the substrate from the fixture, wherein the part remains bonded to the substrate as they are separated from the fixture, wherein a bending stiffness of the fixture is greater than a bending stiffness of the part, wherein the fixture comprises a layer which contacts the substrate and is formed from a different material to the substrate, and wherein the fixture has a mass or thermal mass which is less than ten times a collective mass or thermal mass of the substrate and the part.

18. The method of claim 17 wherein the fixture has a mass or thermal mass which is less than two times a collective mass or thermal mass of the substrate and the part.

19. The method of claim 17, wherein the fixture has a mass or thermal mass which is less than five times a collective mass or thermal mass of the substrate and the part.

* * * * *